(12) United States Patent
Hurtta et al.

(10) Patent No.: US 7,526,642 B2
(45) Date of Patent: Apr. 28, 2009

(54) CONTROLLING DELIVERY OF CERTIFICATES IN A MOBILE COMMUNICATION SYSTEM

(75) Inventors: Tuija Hurtta, Espoo (FI); Nadarajah Asokan, Espoo (FI); Philip Ginzboorg, Espoo (JP); Valtteri Niemi, Helsinki (FI); Miikka Poikselkä, Espoo (FI); Timo M. Rantalainen, Helsinki (FI)

(73) Assignee: Nokia Corporation, Espoo (FI)

( * ) Notice: Subject to any disclaimer, the term of this patent is extended or adjusted under 35 U.S.C. 154(b) by 698 days.

(21) Appl. No.: 10/338,885

(22) Filed: Jan. 9, 2003

(65) Prior Publication Data
US 2004/0073785 A1 Apr. 15, 2004

(30) Foreign Application Priority Data
Oct. 9, 2002 (FI) .................................. 20021805
Oct. 15, 2002 (FI) .................................. 20021833

(51) Int. Cl.
*H04L 9/00* (2006.01)
*H04K 1/00* (2006.01)
*H04M 1/66* (2006.01)

(52) U.S. Cl. ........................ 713/155; 713/156; 713/175; 380/247; 455/410

(58) Field of Classification Search ......... 713/155–156, 713/175; 380/247–250; 705/67; 455/432.1
See application file for complete search history.

(56) References Cited

U.S. PATENT DOCUMENTS

| 6,108,788 | A | * | 8/2000 | Moses et al. ................ 713/155 |
| 6,430,688 | B1 | * | 8/2002 | Kohl et al. .................... 713/156 |
| 6,564,320 | B1 | * | 5/2003 | de Silva et al. .............. 713/156 |
| 6,671,804 | B1 | * | 12/2003 | Kent ........................... 713/175 |
| 7,225,341 | B2 | * | 5/2007 | Yoshino et al. .............. 713/193 |
| 2002/0010861 | A1 | * | 1/2002 | Matsuyama et al. ......... 713/182 |
| 2002/0056039 | A1 | | 5/2002 | Lim et al. |
| 2002/0099822 | A1 | | 7/2002 | Rubin et al. |
| 2002/0108042 | A1 | * | 8/2002 | Oka et al. .................... 713/175 |
| 2002/0136226 | A1 | * | 9/2002 | Christoffel et al. .......... 370/401 |
| 2002/0150241 | A1 | * | 10/2002 | Scheidt et al. ................ 380/44 |
| 2002/0184444 | A1 | * | 12/2002 | Shandony .................... 711/118 |
| 2006/0168446 | A1 | * | 7/2006 | Ahonen et al. .............. 713/163 |

FOREIGN PATENT DOCUMENTS

WO   WO 00/38440   6/2000

OTHER PUBLICATIONS

Prasad V. et al. "Scalable policy driven and general purpose public key infrastructure (PKI)" Computer Security Applications, 2000, pp. 138-147.
Brutch T. G. et al. "Mutual Authentication, Confidentiality, and Key MANagament (MACKMAN) System for Mobile Computing and Wireless Communication" Computer Security Applications Conference, 1998.

* cited by examiner

*Primary Examiner*—Minh Dieu Nguyen
(74) *Attorney, Agent, or Firm*—Squire, Sanders & Dempsey, LLP

(57) ABSTRACT

In order to enable a home network operator to also control the issuing of certificates to a roaming subscriber, first information indicating whether or not it is allowed to issue a certificate to the subscriber is maintained in the subscription information. The first information is checked in response to a subscriber's certificate request received from the subscriber and the certificate is generated and delivered to the subscriber only if certificate issuance is allowed.

20 Claims, 5 Drawing Sheets

CONTROLLING DELIVERY OF CERTIFICATES IN A MOBILE COMMUNICATION SYSTEM

FIELD OF THE INVENTION

The invention relates to controlling the delivery of certificates to mobile user equipment in a mobile communication system. The mobile communication system generally refers to any telecommunication system which enables wireless communication when a user is located within the service area of the system.

BACKGROUND OF THE INVENTION

Telecommunication systems, particularly mobile communication systems, are developing at an increasing pace. While the telecommunication systems have evolved, services provided via the systems also have been under development. Many services, for example, services involving financial transactions, employ digital certificates, hereinafter called certificates, to dynamically establish a level of trust between the parties, i.e. a two-way trust relationship between a service provider and a subscriber using the service. By issuing certificates to subscribers an operator can also offer authorization and accounting to services provided by other service providers. A certificate is a proof normally supplied by a third party, usually a certification authority, to confirm that a digital signature belongs to a certain person or organization and is valid.

One of the problems associated with certificates in a mobile communication system originates from the subscribers' ability to move within the service area of the system. A subscriber in a service area of a visited network, i.e. another network than his home network, may need a certificate issued by the operator of the visited network, for example when he wishes to use services provided by a service provider who has a contractual relationship with the visited network operator. However, the subscriber has a contractual relationship with his home network operator, and therefore, the home network operator should have some control over issuing certificates in visited networks.

BRIEF DESCRIPTION OF THE INVENTION

An object of the present invention is to provide a method and an apparatus for implementing the method which enable the home network operator to control the issuing of certificates for subscribers in visited networks. The object of the invention is achieved by a method and an arrangement which are characterized by what is stated in the independent claims. The preferred embodiments of the invention are disclosed in the dependent claims.

The invention is based on the idea of maintaining in subscription data at least an indication whether or not it is allowed to issue certificates for the subscriber and checking the value of the indication before issuing certificates.

An advantage of the method and arrangement of the invention is that it enables also the home network operator to control certificates issued in visited networks. In other words, the present invention provides sufficient assurance both to a subscriber and a service provider relating to use and issuance of certificates even when the subscriber is roaming.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
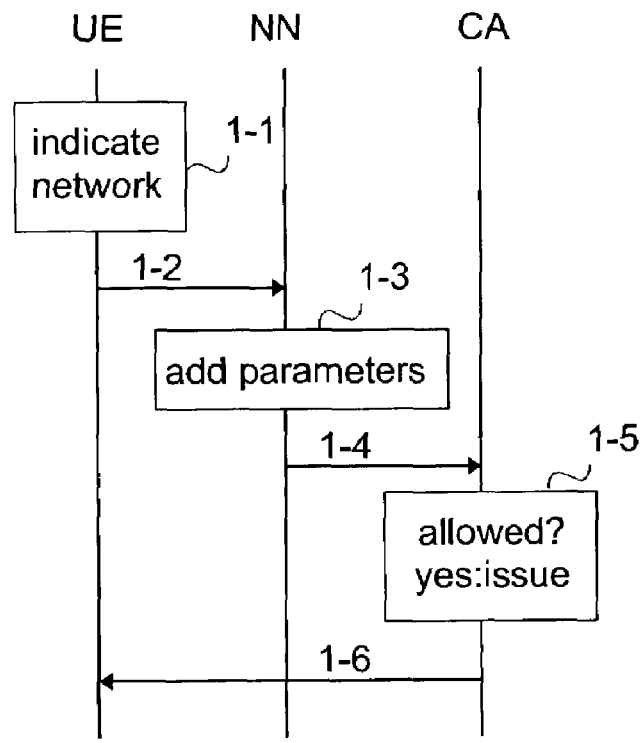
FIGS. 1 to 5 illustrate signaling in different embodiments of the invention.
Figure 2:
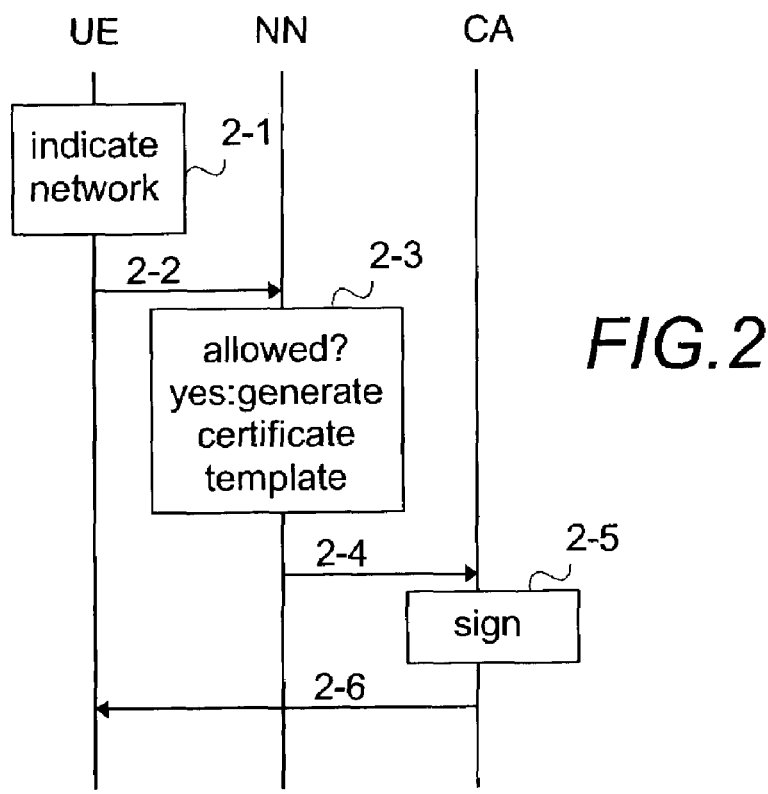

The present invention is applicable in any telecommunication system providing services that require certificates. Such systems include for instance what are called third generation mobile systems, such as the UMTS (Universal Mobile Communication System) and systems based on GSM (Global System for Mobile communication) or corresponding systems, such as GSM 2+ systems and the future $4^{th}$ generation systems. In the following, the invention will be described by using different exemplary systems. The specifications of telecommunication systems and particularly wireless telecommunication systems develop rapidly. Such development may require extra changes to the invention. Therefore, all words and expressions should be interpreted broadly and they are intended to illustrate, not restrict the invention.

FIGS. 1 to 5 illustrate signaling principles according to different embodiments of the invention. In the examples illustrated in FIGS. 1 to 5 it is assumed that the certificate issuance is allowed. UE represents in FIGS. 1 to 5 a subscriber requesting a certificate, NN represents a network node having inventive features and CA is the certification authority. Examples of the NN are given later with reference to FIGS. 6 to 11 as well as examples of the signaling messages and protocols that may be used. The signaling messages and points shown in FIGS. 1 to 5 are simplified and aim only at describing the idea of the invention. Therefore nodes and signaling to which the inventive functionality is transparent are not shown in the Figures. In other words, nodes via which signaling messages are transmitted and nodes which may map a signaling message of protocol one to a signaling message of protocol two, i.e. nodes performing prior art functions, and corresponding signaling messages are not described in the Figures. Examples of more specified signaling are described with system architectures 3a and 3b. Other signaling messages may be sent and/or other functions carried out between the messages and/or the points. The order of the signaling messages and/or points may differ from what will be described below. The signaling messages serve only as examples and they may contain only some of the information mentioned below. The messages may also include other information.

FIGS. 6 to 11 show simplified network architectures and only show some elements of the architecture of a system illustrated in the Figure in question. The network nodes shown in FIGS. 6 to 11 are logical units whose implementation may differ from what is shown. The logical units may be combined to each other, i.e. a functionality of one logical unit described below may be enhanced to comprise a functionality of another logical unit described below. The connections shown in FIGS. 6 to 11 between network nodes are logical connections, the actual physical connections may be different than the logical connections. It is apparent to a person skilled in the art that the systems comprise also other functions and structures that need not be described in detail herein.

The user equipment UE, i.e. the terminal, may be any mobile node or a mobile host which has a radio interface to the network. It can be, for example, a speech-only mobile station, a multi-service terminal that serves as a service platform and supports the loading and execution of different functions related to services, or a laptop PC connected to a cellular phone capable of packet radio operation. The other embodiments of the UE include various pagers, remote-controllers, monitoring and/or data acquisition devices, etc. In this context, the user equipment UE generally refers to a combination of an actual terminal and a user of the terminal, i.e. as regards mobile phones, to a combination of a mobile unit and a mobile subscriber, which is identified in the system by e.g. a SIM (Subscriber Identity Module) card detachably coupled to the mobile unit. The SIM card is a smart card that holds the subscriber identity, performs authentication algorithms, and stores authentication and encryption keys and some subscription information that is needed in the mobile station.

The UE of the invention may be configured to indicate whether a certificate is requested from the subscriber's home network or from the visited network. The network may be configured to check, whether the request can be granted, for example whether the UE has a right to make the request in the visited network or whether the UE has a right to a certificate in the network.

The certification authority CA provides certificates to the transaction parties, i.e. it is the trusted third party. Typically each network has its own CA. The implementation of different certificate functions, including issuing, generating, signing and usage of certificates and the manner how and the place from which the issued certificates are obtained are not significant to the invention. Other details relating to the certificates, such as how they are used and what for or where they are stored, are of no importance to the invention either.

Embodiment 1

A subscriber, i.e. a user of the UE, wants to use a service requiring a certificate. The UE therefore generates a certificate request and in point 1-1 adds to the request an indication indicating whether the certificate is requested from the subscriber's home network or from the visited network. The UE then sends the certificate request in message 1-2. The indication may be a parameter having two different values: home network CA and visited network CA. The indication may also be the address of the CA given as a parameter in the request. It is also possible that a request without any address of the CA indicates that the certificate is to be issued by the visited network (by the CA in the visited network). The indication may also be the address of the network node the message is sent to. The required service may also indicate which one of the networks should issue the certificate. Thus the invention does not limit how the network is indicated.

In response to receiving the certificate request in message 1-2, the NN adds parameters in point 1-3 to the certificate request and sends the request with the added parameters in message 1-4 to the CA of the indicated network, i.e. either to the CA in the home network or to the CA in the visited network, depending on the indication in message 1-2. The added parameters depend on the system and will be discussed below with reference to FIGS. 6 to 11. Depending on the implementation, message 1-4 may or may not contain the indication of message 1-2.

In response to receiving the certificate request in message 1-4, the CA first checks in point 1-5, whether it is allowed to issue a certificate or certificates to the subscriber (or to a subscriber profile the subscriber is currently using). The CA checks this preferably from the parameters the NN added. The CA may also perform the check by sending a message to the subscriber's HSS (Home Subscriber Server) or to another network node comprising subscription information, inquiring in the message whether or not it is allowed to issue certificates to the subscriber (or to the subscriber profile the subscriber is currently using, if the system supports different subscriber profiles). The information indicating whether or not it is allowed to issue certificates may also be stored to the CA. In this example the CA finds out that the certificate issuance is allowed and issues the certificate in point 1-5. In other words, the CA decides the certificate values, generates and signs the certificate and stores a record in a database. When the certificate is issued, the CA delivers the certificate in message 1-6 to the UE. Message 1-6 may be sent via the NN.

If it is not allowed to issue certificates, the CA does not issue the certificate in point 1-5, and message 1-6 contains a negative response to the certificate request.

Embodiment 2

The performance of the UE is similar in embodiments 1 and 2. In other words, the UE generates a certificate request and in point 2-1 adds to the request an indication indicating whether the certificate is requested from the subscriber's home network or from the visited network. Then the UE sends the certificate request in message 2-2.

In response to receiving message 2-2, the NN first checks in point 2-3, whether it is allowed to issue a certificate or certificates to the subscriber (or to the subscriber profile the subscriber is currently using). The NN checks this preferably from that part of the subscription data it has copied (downloaded) from the subscriber's HSS. The NN may also perform the check by sending a message to the subscriber's HSS or to another network node comprising subscription data, inquiring in the message whether or not it is allowed to issue certificates to the subscriber (and to the subscriber profile the subscriber is currently using, if the system supports different subscriber profiles). The information indicating whether or not it is allowed to issue certificates may also be stored to the NN. In this example the NN finds out that the certificate issuance is allowed and generates a certificate template in point 2-2. In other words, the NN decides the certificate values and generates the certificate. The NN then sends the certificate template to the CA of the network indicated in message 2-2, i.e. either to the CA in the home network or to the CA in the visited network.

In response to receiving the certificate template in message, 2-4, the CA signs the certificate in point 2-5 and delivers the certificate in message 2-6 to the UE. Message 2-6 may be sent via the NN. The CA preferably stores a record in a database after signing the template. However, in embodiments where message 2-6 is sent via the NN it is also possible that the NN stores the signed certificate.

If it is not allowed to issue certificates, the NN does not generate a certificate template and, instead of sending message 2-4, it sends to the UE a message containing a negative response to the certificate request.

Embodiment 3

The performance of the UE is similar in embodiments 1, 2 and 3. In other words, the UE generates a certificate request and in point 3-1 adds to the request an indication indicating whether the certificate is requested from the subscriber's home network or from the visited network. The UE then sends the certificate request in message 3-2.

In response to receiving message 3-2, the NN first checks in point 3-3, whether it is allowed to issue a certificate or certificates to the subscriber (or to the subscriber profile the subscriber is currently using). The NN checks this preferably from that part of the subscription data it has copied (downloaded) from the subscriber's HSS. The NN may also perform the check by sending a message to the subscriber's HSS or to another network node comprising subscription data, inquiring in the message whether or not it is allowed to issue certificates to the subscriber (or to the subscriber profile the subscriber is currently using, if the system supports different subscriber profiles). The information indicating whether or not it is allowed to issue certificates may also be stored to the NN. In this example the NN finds out that the certificate issuance is allowed and the NN adds parameters in point 3-3 to the certificate request and sends the request with the added parameters in message 3-4 to the CA of the indicated network, i.e. either to the CA in the home network or to the CA in the visited network, depending on the indication in message 3-2. The added parameters depend on the system and will be discussed below with reference to FIGS. 6 to 11. Depending on the implementation, message 3-4 may or may not contain the indication of message 3-2.

In response to receiving the certificate request in message 3-4, the CA issues the certificate in point 3-5. In other words, the CA decides the certificate values, generates and signs the certificate and stores a record in a database. When the certificate is issued the CA delivers the certificate in message 3-6 to the UE. Message 3-6 may be sent via the NN.

If it is not allowed to issue certificates, the NN does not add parameters to the certificate request in point 3-3 and, instead of sending message 3-4, it sends to the UE a message containing a negative response to the certificate request.

Embodiment 4

The performance of the UE is similar in embodiments 1, 2, 3 and 4. In other words, the UE generates a certificate request and in point 4-1 adds to the request an indication indicating whether the certificate is requested from the subscriber's home network or from the visited network. The UE then sends the certificate request in message 4-2.

In response to receiving message 4-2, the network node NN1 checks in point 4-3, whether it is allowed to issue a certificate or certificates to the subscriber (or to the subscriber profile the subscriber is currently using). The NN1 checks this preferably from that part of the subscription data it has copied (downloaded) from the subscriber's HSS. The NN1 may also perform the check by sending a message to the subscriber's HSS or to another network node comprising subscription data, inquiring in the message whether or not it is allowed to issue certificates to the subscriber (or to the subscriber profile the subscriber is currently using, if the system supports different subscriber profiles). The information indicating whether or not it is allowed to issue certificates may also be stored to the NN1. In this example the NN1 finds out that the certificate issuance is allowed and the NN1 forwards the certificate request in message 4-4.

In response to receiving message 4-4, the network node NN2 adds parameters in point 4-5 to the certificate request and sends the request with the added parameters in message 4-6 to the CA of the indicated network, i.e. either to the CA in the home network or to the CA in the visited network, depending on the indication in message 4-2. The added parameters depend on the system and will be discussed below with reference to FIGS. 6 to 11. Depending on the implementation, message 4-6 may or may not contain the indication of message 4-2.

In response to receiving the certificate request in message 4-6, the CA issues the certificate in point 4-7. In other words, the CA decides the certificate values, generates and signs the certificate and stores a record in a database. When the certificate is issued the CA delivers the certificate in message 4-8 to the UE. Message 4-8 may be sent via the NN1 and/or the NN2.

If it is not allowed to issue certificates, instead of sending message 4-4, the NN1 sends to the UE a message containing a negative response to the certificate request.

Embodiment 5

The performance of the UE is similar in embodiments 1, 2, 3, 4 and 5. In other words, the UE generates a certificate request and in point 5-1 adds to the request an indication indicating whether the certificate is requested from the subscriber's home network or from the visited network. The UE then sends the certificate request in message 5-2.

In response to receiving message 5-2, the network node NN1 checks in point 5-3, whether it is allowed to issue a certificate or certificates to the subscriber (or to the subscriber profile the subscriber is currently using). The NN1 checks this preferably from that part of the subscription data it has copied (downloaded) from the subscriber's HSS. The NN1 may also perform the check by sending a message to the subscriber's HSS or to another network node comprising subscription data, inquiring in the message whether or not it is allowed to issue certificates to the subscriber (or to the subscriber profile the subscriber is currently using, if the system supports different subscriber profiles). The information indicating whether or not it is allowed to issue certificates may also be stored to the NN1. In this example the NN1 finds out that the certificate issuance is allowed and the NN1 forwards the certificate request in message 5-4.

In response to receiving message 5-4, the network node NN2 determines in point 5-5 the CA towards which the request should be sent, i.e. either to the CA in the home network or to the CA in the visited network, depending on the indication in message 5-2. In other words, the NN2 decides in point 5-5 where to send the request. After the target CA or its network address is known, the NN2 sends the request in message 5-6. Depending on the implementation, message 5-6 may or may not contain the indication of message 5-2.

In response to receiving message 5-6, the network node NN3 adds parameters to the certificate request in point 5-7 and sends the request with the added parameters to the CA in message 5-8. The added parameters depend on the system and will be discussed below with reference to FIGS. 6 to 11. Depending on the implementation, message 5-8 may or may not contain the indication of message 5-2.

In response to receiving the certificate request in message 5-8, the CA issues the certificate in point 5-9. In other words, the CA decides the certificate values, generates and signs the certificate and stores a record in a database. When the certificate is issued the CA delivers the certificate in message 5-10 to the UE. Message 5-10 may be sent via the NN1, NN2 and/or the NN3.

If it is not allowed to issue certificates, instead of sending message 5-4, the NN1 sends to the UE a message containing a negative response to the certificate request.

System Architecture 1

Figure 6:
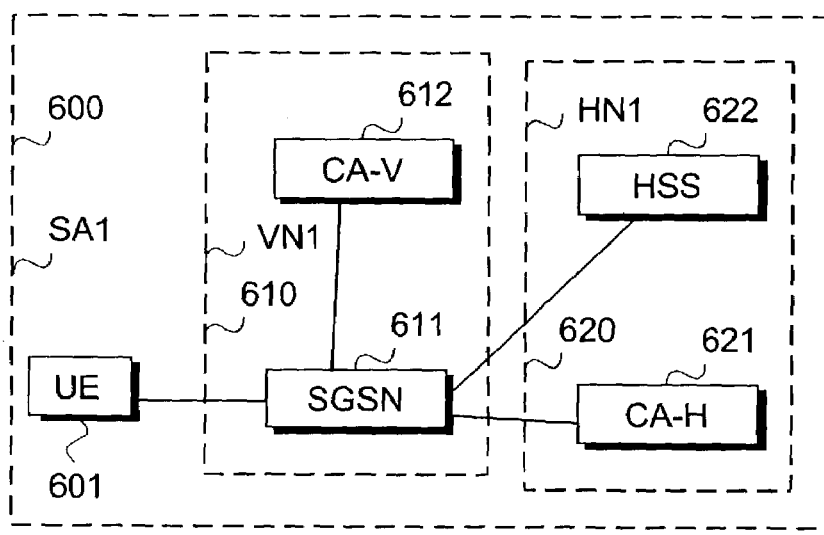
FIGS. 6 to 11 show different system architectures.

FIG. 6 illustrates an exemplary system SA1 utilizing GPRS (General Packet Radio Service). The system SA1 may be a 3GPP AII-IP system based on the IP (Internet Protocol) technology, specified in the third generation partnership project 3GPP, for example. The system SA1 600 comprises a visited network VN1 610 and a home network HN1 620 for a subscriber using user equipment UE 601. The visited network VN1 comprises a serving GPRS support node SGSN 611 serving the UE 601 and a certification authority CA-V 612. The home network HN1 comprises a certification authority CA-H 621 and a home subscriber server HSS 622. It bears no significance to the invention how the UE 601 is connected to the system infrastructure and how different nodes, networks, authorities and servers are interconnected, and thus the connection alternatives are not discussed here. However, all network nodes and certification authorities are preferably part of network domain security (NDS) so that secure communication between a certification authority CA-H 621, CA-V 612 and the SGSN 611 can be provided.

An interface between the UE 601 and the SGSN 611 is preferably an existing interface providing IP connections, such as an SM (Session Management) interface. Interfaces between the SGSN 611 and the CA-H 621, CA-V 612 are preferably new interfaces providing IP connections, whereas an interface between the SGSN 611 and the HSS 622 is preferably a MAP (Mobile Application Part) interface.

The UE 601 and the certification authority CA (CA-H, CA-V) are described above and the description is not repeated here. However, they need to support required interfaces and signaling.

The subscription data of a subscriber, also called subscriber information, is stored permanently or semi-permanently in a memory of a GPRS register called the HSS 622 in such a manner that the subscription data is connected to the subscriber's identifier IMSI or to another corresponding identifier identifying the subscriber. The subscription data includes routing information, i.e. the current location of the subscriber, and information on the services the subscriber can access. The subscription data according to the present invention comprises further information on whether or not it is allowed to issue certificates to the subscriber. The information may be just one parameter indicating whether or not this is allowed. The information may also indicate if it is allowed to issue certificates from the home network and/or visited network. It is also possible to use a combination of different parameters or to list those CAs which are allowed to issue certificates or those networks in which the issuance of certificates is allowed. The information may be common to a subscription, i.e. subscriber-specific, or subscriber-profile-specific, or common to all subscribers, e.g. operator-specific, or common to many subscribers. In a case the subscriber belongs to a group of subscribers, the information may be group-specific. The information may also comprise an address of the CA in the home network, i.e. the address of the CA-H 621.

The serving GPRS support node SGSN 611 provides user equipments UE 601 with packet data service within the area of one or more cells in its service area in a cellular packet radio network. The main functions of the SGSN 611 are to detect new UEs in its service area, to carry out registration of new user equipments UE together with GPRS registers, to send data packets to or to receive them from the UE 601, and to keep a record of the location of the UEs within its service area. This means that the SGSN 611 carries out security functions and access control, such as authentication and encryption procedures. Usually at least part of the subscription data is downloaded to the SGSN 611 when the UE 601 registers to the system.

The SGSN 611 may carry out the functionality of the NN according to embodiment 1, 2 or 3 of the invention or any derivate thereof. When the functionality of the NN is implemented at the SGSN 611, the SGSN has to support required interfaces and signaling. The parameters added in points 1-2 or 3-2 of FIGS. 1 and 3 may be MSISDN, IMSI, certificate-related parameters from the subscriber profile, and/or the quality of subscriber authentication, for example. In embodiment 2 the interface between the SGSN and the CA (CA-H, CA-V) is preferably based on an existing standard RA-CA (registration authority-certification authority) interface specification or on a corresponding standard interface specification.

The SGSN 611 may receive the address of the CA-H 621 either on subscription data or, if the address of the CA-H 621 is stored in the UE 601, together with the indication indicating that the certification authority of the home network is to be used along with the address. It is also possible that the address servers as the indication, i.e. when in the message containing the certificate request there is an address relating to the certificate request, the SGSN 611 routes the request to the addressed CA whereas if there is no address in the certificate request, the SGSN 611 routes the request to the CA of its own network, i.e. to the CA-V 612.

The advantages of using system SA1 600 to implement the present invention are that there is no need to define new security procedures, because the existing secure communication channel between the UE 601 and the SGSN 611 can be used; addressing of the local CA-V 612 is easy, because the SGSN 611 always locates in the same network and therefore it is easy to store the address of the local CA-V 612 to the SGSN 611; and the SGSN can easily handle the subscription data check or deliver the needed information to the CA, because the required subscription data (or subscriber profile) is downloaded to the SGSN.

System Architecture 2

Figure 7:
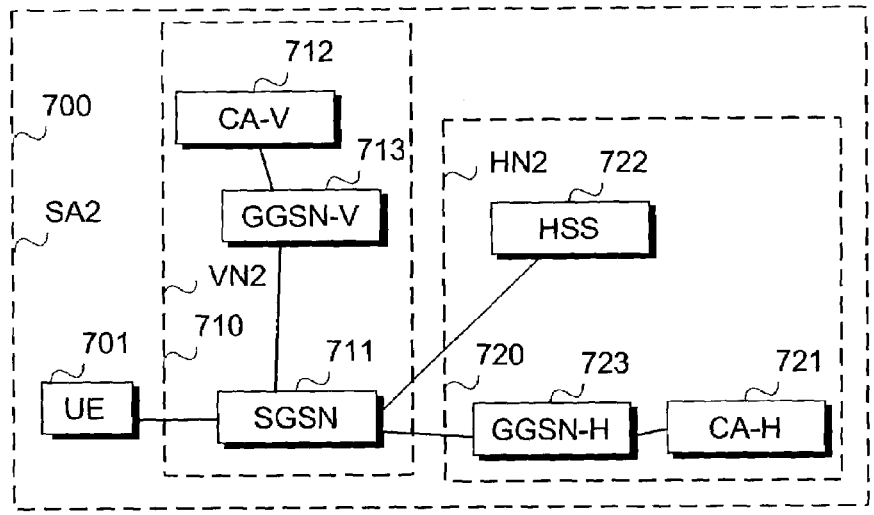

FIG. 7 illustrates an exemplary system SA2 700 utilizing also GPRS (General Packet Radio Service). The system SA2 700 may be a 3GPP AII-IP system. The system SA2 700 comprises a visited network VN2 711 and a home network HN2 720 for a subscriber using user equipment UE 701. The visited network VN2 710 comprises a serving GPRS support node SGSN 711 serving the UE 701, a gateway GPRS support node GGSN-V 713 and a certification authority CA-V 712. The home network HN2 720 comprises a gateway GPRS support node GGSN-H 723, a certification authority CA-H 721 and a home subscriber server HSS 722. It bears no significance to the invention how the UE 701 is connected to the system infrastructure and how different nodes, networks, authorities and servers are interconnected, and therefore the connection alternatives are not discussed here. However, all network nodes and certification authorities are preferably part of a network domain security (NDS) so that secure communication between a CA and a GGSN can be provided, i.e. a secure communication between the CA-H 721 and the GGSN-H 723 and between the CA-V 712 and the GGSN-V 713.

An interface between the UE 701 and the SGSN 711 is preferably an SM interface, an interface between the SGSN 711 and the HSS 722 is preferably a MAP interface, interfaces between the SGSN 711 and the GGSN-V 713 and the GGSN-H 723 are preferably GTP (GPRS Tunneling Protocol) interfaces, and interfaces between a GGSN and a corresponding CA, i.e. between the GGSN-V 713 and CA-V 712 and between the GGSN-H 723 and CA-H 721 are preferably new interfaces providing IP connections. To support certificate issuance, existing SM messages or GTP messages may be used or new SM messages and GTP messages may be needed for the standards.

The UE 701, the certification authority CA (CA-H, CA-V), the HSS 722 and the SGSN 711 are described above and therefore the description is not repeated here. However, they need to support required interfaces and signaling.

Each gateway GPRS support node GGSN-H 723, GGSN-V 713 functions as a router. The main functions of the GGSNs involve interaction with external systems, data networks and/or other GPRS networks. The GGSN may also be connected directly to a private corporate network or a host. The GGSN may also transmit packets from one mobile station to another within the network. The GGSN includes PDP (packet data protocol) addresses and routing information, i.e. SGSN addresses of active GPRS subscribers.

The GGSN may carry out the functionality of the NN according to embodiment 1, 2 or 3 of the invention or any derivate thereof. When the functionality of the NN is implemented at the GGSN, the GGSN has to support the required interfaces and signaling as well as the SGSN transmitting the certificate request to the GGSN and the certificate to the UE 701. The parameters added in points 1-2 or 3-2 of FIGS. 1 and 3 may be MSISDN, IMSI, certificate-related parameters from the subscription data (subscriber profile), and/or the quality of subscriber authentication, for example. In order to allow the GGSN to obtain some of these parameters, the SGSN may add some of them to the message containing the certificate request before forwarding the request to the GGSN. Another possibility is that the GGSN requests them in points 1-2 or 3-2 from the HSS 722 or from the SGSN 711. In embodiment 2 the interface between the GGSN and the CA is preferably based on an existing standard RA-CA interface or on a corresponding standard interface.

In some embodiments of the invention employing the SA2 700, information indicating whether the certificate issuance is allowed or not may be stored to the GGSN or to the CA. This information may be operator-specific, indicating, for example, the operator with the mobile country code and the mobile network code and indicating whether the issuance of the certificates to the subscribers of the operator is allowed.

The SGSN 711 preferably selects the GGSN, i.e. the indicated network, towards which it sends the message containing the certificate request on the basis of the PDP context. The GGSN may reside either in the home network or in the visited network, and the location of the GGSN is normally controlled by the subscription information. (The GPRS interface comprises one or more individual PDP contexts for one subscriber, each PDP context describing the packet data address and different data transmission parameters related thereto.) Another possibility is that the SGSN receives the address of the CA-H 721 or the GGSN-H 723 either on subscription data or, if the address of the CA-H 721 or the GGSN-H 723 is stored in the UE 701, together with the indication indicating that the certification authority of the home network is to be used along with the address. It is also possible that the address serves as the indication, i.e. when in the message containing the certificate request there is an address relating to the certificate request, the SGSN 711 routes the request to the GGSN addressed directly or indirectly, and, if there is no address in the certificate request, the SGSN 711 routes the request to the GGSN of its own network, i.e. to the GGSN-V 713.

An alternative for the use of new messages between itself and the UE 701, the SGSN 711 and the GGSN may utilize a parameter called protocol configuration options, PCO IE. The PCO IE is exchanged between the UE 701 and the GGSN during a PDP context activation, a secondary PDP context activation, and/or a PDP context modification. The certificate request and response may be encapsulated to the PCO IE. The PCO IE is transparent to the SGSN 711 and the messages and procedures are well known for a person skilled in the art, and therefore they are not discussed in more detail here. In cases where the maximum length of the PCO IE, which is 253 bytes, is not enough, alternatives to new signaling messages are to use a continuation of the message as user data over the related PDP context or to increase the maximum length of the PCO IE. If the continuation of the message as user data is used, the GGSN may indicate an address of the CA to which the UE 701 should contact for the continuation of the message to the UE 701. Depending on the implementation, the UE 701 may be configured to add a certificate request every time a PDP context is activated and/or modified, or if a predetermined PDP context is activated and/or modified. The UE 701 may also be configured to add a certificate request to the PDP context activation, to the secondary PDP context activation, and/or to the PDP context modification messages only when needed.

The advantages of using system SA2 700 to implement the present invention are that there is no need to define new security procedures, since the existing secure communication channel between the UE 701 and the GGSN can be used and the GGSN is the network node planned to be used when information is exchanged with nodes (or elements) external to the packet-switched network serving the UE 701.

When the PCO IE is used another advantage is that there is no need for new signaling messages.

System Architecture 3

Figure 8:
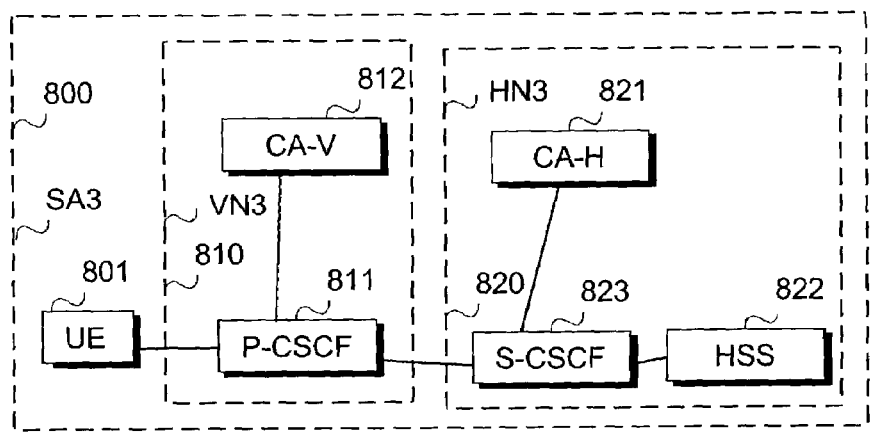

FIG. 8 illustrates an exemplary system SA3 800 utilizing IMS (IP Multimedia Subsystem). The IMS provides multimedia services which are usually, although not necessarily, Internet-based services employing a packet protocol. Thus, the system SA3 800 may also be a 3GPP All-IP system. The system SA3 800 comprises a visited network VN3 810 and a home network HN3 820 for a subscriber using user equipment UE 801. The visited network VN3 810 comprises a proxy connection state control function P-CSCF 811 and a certification authority CA-V 812. The home network HN3 820 comprises a serving connection state control function SCSCF 823, a certification authority CA-H 821 and a home subscriber server HSS 822. It bears no significance to the invention how the UE 801 is connected to the system infrastructure and how different nodes, networks, authorities and servers are interconnected and therefore the connection alternatives are not discussed here. However, all network nodes and certification authorities are preferably part of a network domain security (NDS) so that secure communication between a CA and a CSCF can be provided.

An interface between the UE 801 and the P-CSCF 811 is preferably an SIP (Session Initiation Protocol) interface, as well as an interface between the P-CSCF 811 and the S-CSCF 823, and an interface between the S-CSCF 823 and the HSS 822 is preferably a Diameter interface, whereas interfaces between a CSCF and a corresponding CA, i.e. between the P-CSCF 811 and CA-V 812 and between the SCSCF 823 and CA-H 821, are preferably new interfaces.

Since the UE 801, the certification authority CA (CA-H, CA-V), and the HSS 822 are described above, the description is not repeated here. However, they need to support required interfaces and signaling.

The serving connection state control function S-CSCF 823 is a network node which participates in controlling a session made by the user equipment of a subscriber and in supporting the establishment of sessions terminating at the subscriber registered in the network, as well as in supporting the triggering of the services associated with these sessions when the triggering conditions are fulfilled. The S-CSCF 823 usually contains a subscriber database which logically corresponds to the visitor location register of the GSM system, i.e. it is a database to which required subscription data is downloaded from the HSS 822 when the UE 801 registers to the S-CSCF 823.

The P-CSCF 811 is proxy serving connection state control communicating with the S-CSCF 823.

The S-CSCF 823 may carry out the functionality of the NN according to embodiment 1, 2 or 3 of the invention or any derivate thereof. When the functionality of the NN is implemented at the S-CSCF 823, the S-CSCF has to support required interfaces and signaling as well as the P-CSCF 811 transmitting the certificate request to the S-CSCF 823 and to the CA-V 812 if the visited network is indicated in the certificate request and transmitting the certificate to the UE 801. Furthermore, the P-CSCF 811 is preferably arranged to route the message containing the certificate request, i.e. message 1-2, 2-2 or 3-2 in FIGS. 1 to 3, to the S-CSCF 823, regardless of which network is requested to issue the certificate, and, in response to a message containing the certificate request received from the S-CSCF 823, to route the message to the CA-V 812. Correspondingly, the S-CSCF 823 is preferably arranged to route the certificate request or certificate template (messages 1-4, 2-4, 3-4 in FIGS. 1 to 3) towards the CA indicated by the UE 801, i.e. directly towards the CA-H 821 or via the P-CSCF 811 to the CA-V 812. In other words, the certificate request is always forwarded to the S-CSCF 823. In embodiment 2 the interface between the S-CSCF 823 and the CA is preferably based on an existing standard RA-CA interface or on a corresponding standard interface.

In another implementation, the P-CSCF 811 may carry out the functionality of the NN according to embodiment 1, 2 or 3 of the invention or any derivate thereof, when the certificate is requested from the visited network. When the functionality of the NN is implemented at the P-CSCF 811, the P-CSCF has to support required interfaces and signaling. In this implementation the P-CSCF 811 is configured to send certificate requests to the CA-V 812. In embodiment 2 the interface between the P-CSCF 811 and the CA is preferably based on an existing standard RA-CA interface or on a corresponding standard interface.

Yet in a further implementation, the S-CSCF 823 may carry out the functionality of the NN1 and the P-CSCF 811 the functionality of the NN2 according to embodiment 4 of the invention. When the functionality of the NN1 is implemented at the S-CSCF 823 and the functionality of the NN2 at the P-CSCF 811, the S-CSCF 823 and the P-CSCF 811 has to support required interfaces and signaling.

Figure 3:
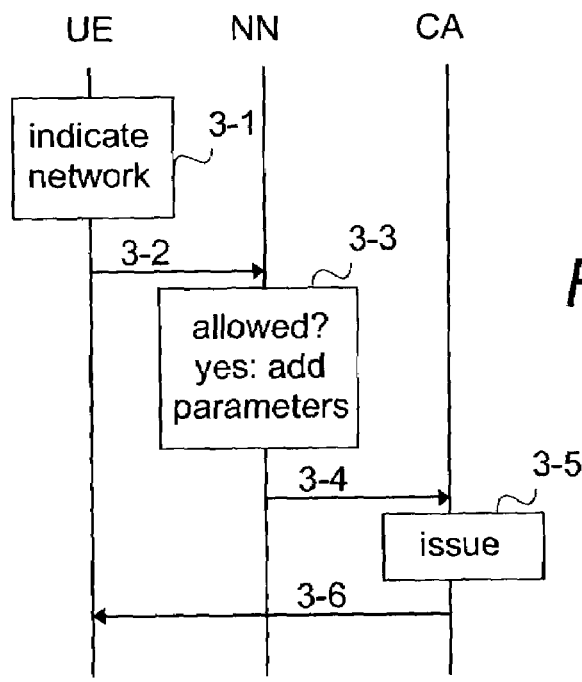
Figure 4:
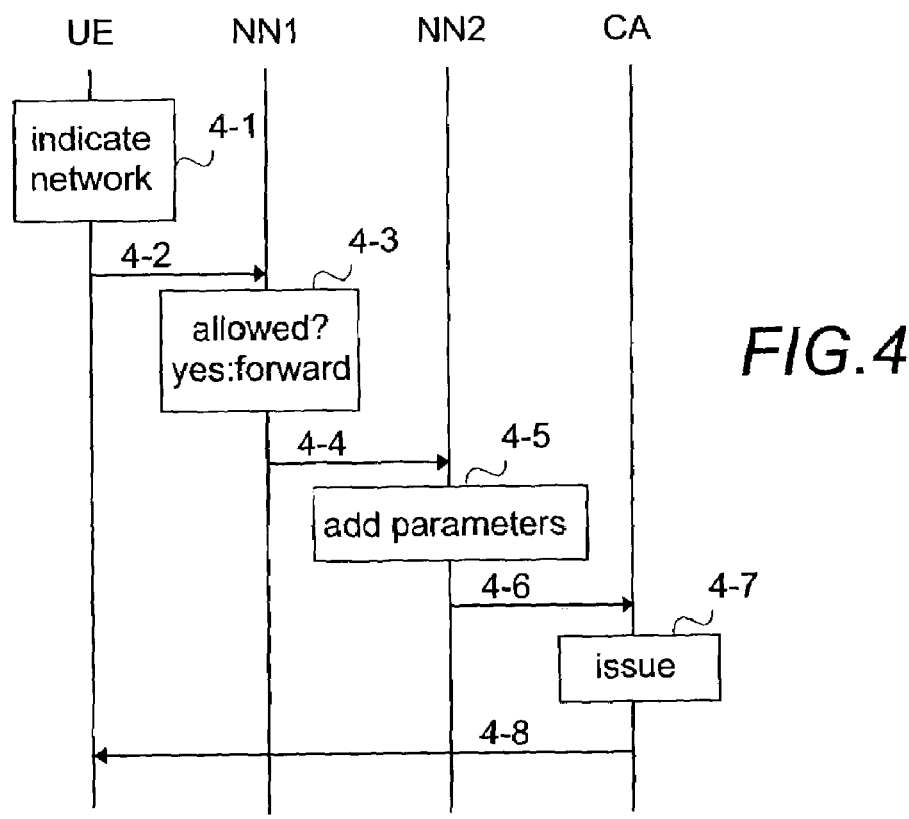
Figure 5:
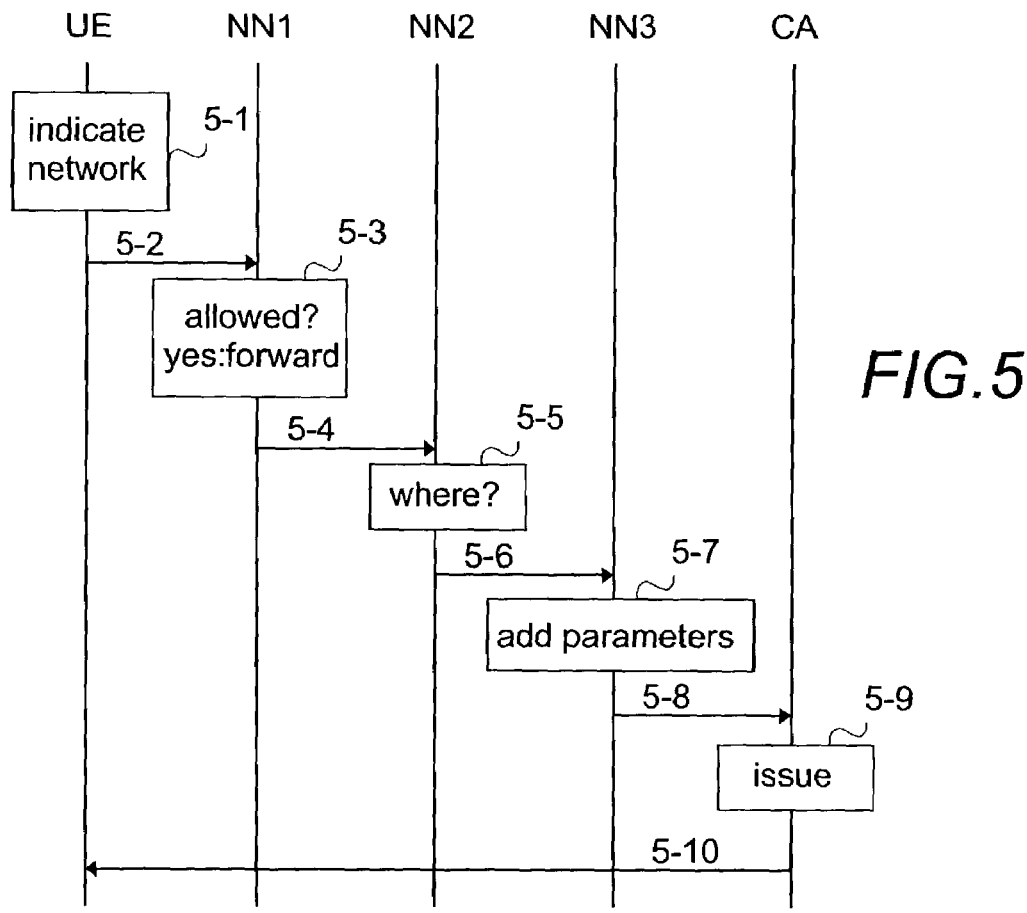

The parameters added in points 1-2 or 3-2 of FIGS. 1 and 3 may be MSISDN, IMS identities and certificate-related parameters from the subscription data (or the subscriber profile).

The certificate request is sent preferably after the UE 801 has performed an IMS registration procedure providing a secure communication channel.

The advantages of using system SA3 800 to implement the present invention are that the check regarding whether or not it is allowed to issue certificates to the subscriber is performed always in the home operator's network, thus adding flexibility to define checking parameters maintained in the HSS 822, and that the subscriber certificates can be obtained over any access network that provides access to IMS, i.e. certificates can be obtained independently of the access network.

System Architecture 3A

Figure 9:
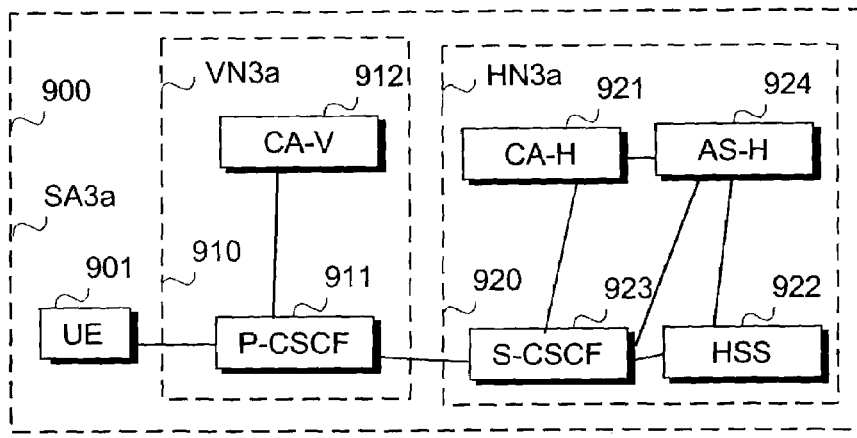

FIG. 9 illustrates an exemplary system SA3*a* 900 also utilizing the IMS and being a derivate of the system SA3 800. System SA3*a* 900 differs from system SA3 800 only in that the system SA3*a* 900 comprises also an application server ASH 924 in the home network. The application server AS-H 924 is offering value added IM services. Since the UE 901, the certification authority CA (CA-H 921, CA-V 912), the P-CSCF 911, the S-CSCF 923 and the HSS 922 and the interfaces between them are described above, the description is not repeated here. However, they need to support required interfaces and signaling. The interfaces between the S-CSCF 923 and the AS-H 924 and the HSS 922 and the AS-H 924 may be ones defined in the 3GPP and thus familiar to a person skilled in the art. The interface between the AS and CA is a new interface. All network nodes and certification authorities are preferably part of a network domain security (NDS) so that secure communication can be provided.

In one implementation, the AS-H 924 may carry out the functionality of the NN according to embodiment 1, 2 or 3 of the invention or any derivate thereof. When the functionality of the NN is implemented at the AS-H 924, the AS-H 924 has to support required interfaces and signaling as well as The P-CSCF 911 transmitting the certificate request to the AS-H 924 and to the CA-V 912 if the visited network is indicated in the certificate request, and transmitting the certificate to the UE 901, also has to support required interfaces and signaling. Furthermore, the P-CSCF 911 is preferably arranged to route the message containing the certificate request, i.e. message 1-2, 2-2 or 3-2 in FIGS. 1 to 3, to the AS-H 924, regardless of which network is requested to issue the certificate, and, in response to a message containing the certificate request received from the AS-H 924, to route the message to the CA-V 912. Correspondingly, the AS-H 924 is preferably arranged to route the certificate request or certificate template (messages 1-4, 2-4, 3-4 in FIGS. 1 to 3) towards the CA indicated by the UE 901, i.e. directly towards the CA-H 921 or via the P-CSCF 911 to the CA-V 912. In other words, the system SA3*a* 900 may be configured to forward the certificate request always to the AS-H 924. In embodiment 2 the interface between the AS-H 924 and the CA-H 921 is preferably based on an existing standard RA-CA interface or on a corresponding standard interface.

Yet in another implementation, the AS-H 924 may carry out the functionality of the NN1 and the P-CSCF 911 the functionality of the NN2 according to embodiment 4 of the invention or any derivate thereof. When the functionality of the NN1 is implemented at the AS-H 924 and the functionality of the NN2 at the P-CSCF 911, the AS-H 924 and the P-CSCF 911 have to support required interfaces and signaling.

In a further implementation, the S-CSCF 923 may carry out the functionality of the NN1 and the AS-H 924 the functionality of the NN2 according to embodiment 4 of the invention or any derivate thereof. When the functionality of the NN1 is implemented at the S-CSCF 923 and the functionality of the NN2 at the AS-H 924, the S-CSCF 923 and the AS-H 924 have to support required interfaces and signaling.

In the following, a more detailed signaling example based on embodiment 4 and the system SA3*a* 900 is described. In the detailed example prior art network nodes and signaling messages which are not described above are enclosed to illustrate the information exchange in more detail. The UE

901 sends message A (e.g. SIP MESSAGE) towards the home network entity, which in this example is the AS-H 924. As stated above, message A contains an indication that the user wants to have a subscriber certificate from the visited network.

The P-CSCF 911 receives message A and forwards it to the S-CSCF 923.

The S-CSCF 923 receives the message A and possibly checks whether it is allowed to issue a certificate or certificates to the subscriber (or to the subscriber profile the subscriber is currently using) from the subscription data, as described above. If the issuing of certificates is not allowed, an error message is sent to the UE 901. If the issuing is allowed, the S-CSCF 923 forwards message A to the AS-H 924. If the S-CSCF 923 is not configured to perform the checking, the S-CSCF 923 simply forwards the message A to the AS-H 924.

When the AS-H 924 receives message A, the AS-H 924 possibly checks whether it is allowed to issue a certificate or certificates to the subscriber (or to the subscriber profile the subscriber is currently using) from the subscription data, as described above. If the issuing of certificates is not allowed, an error message is sent to the UE 901. If the issuing is allowed, or if the AS-H 924 is configured not to perform the checking, the AS extracts the address of P-CSCF 911 from the received message and sends message B to the P-CSCF 911. Message B contains a subscriber certificate request. The AS may add to this request information about the user (e.g. cellular identity) and certificate-related parameters.

The S-CSCF 923 receives message B and forwards message B to the PCSCF 911.

In response to receiving message B, the P-CSCF 911 sends message C, i.e. a certificate request, to the CA-V 912. Message C, i.e. the certificate request, contains information about the user and certificate-related parameters. If the information is not in message B, the information is added to message C by the PCSCF 911. The P-CSCF 911 may also add some extra information with the information received in message B to message C.

The CA-V 912 issues the certificate, i.e. decides certificate values, generates and signs the certificate and stores a record in a database. Then the CA-V 912 delivers the certificate to the P-CSCF 911 by sending message D, i.e. a certificate response. Message D is a response message to message C.

In response to receiving message D, i.e. the certificate response, the PCSCF 911 generates message E, which contains the subscriber certificate and is a response message to message B. The P-CSCF 911 sends message E to the AS-H 924 via the S-CSCF 923. Message E may be a "200 OK" message, for example.

When the AS-H 924 receives message E, the AS-H 924 takes from message E the subscriber certificate and inserts it in message F addressed to the UE 901. Message F is a response message to message A. The AS-H 924 sends message F to the UE 901 via the S-CSCF 923 and the P-CSCF 911. Message F may be a "200 OK" message, for example.

The parameters added in points 1-2, 3-2, 4-5 or 5-7 of FIGS. 1, 3, 4 and 5 may be MSISDN, IMS identities and certificate-related parameters from the subscription data (or the subscriber profile).

The certificate request is sent preferably after the UE 901 has performed an IMS registration procedure providing a secure communication channel.

The advantages of using system SA3*a* 900 to implement the present invention are that the check regarding whether or not it is allowed to issue certificates to the subscriber is performed always in the home operator's network, thus adding flexibility to define checking parameters maintained in the HSS 922, and that the subscriber certificates can be obtained over any access network that provides access to IMS, i.e. certificates can be obtained independently of the access network.

System Architecture 3B

Figure 10:
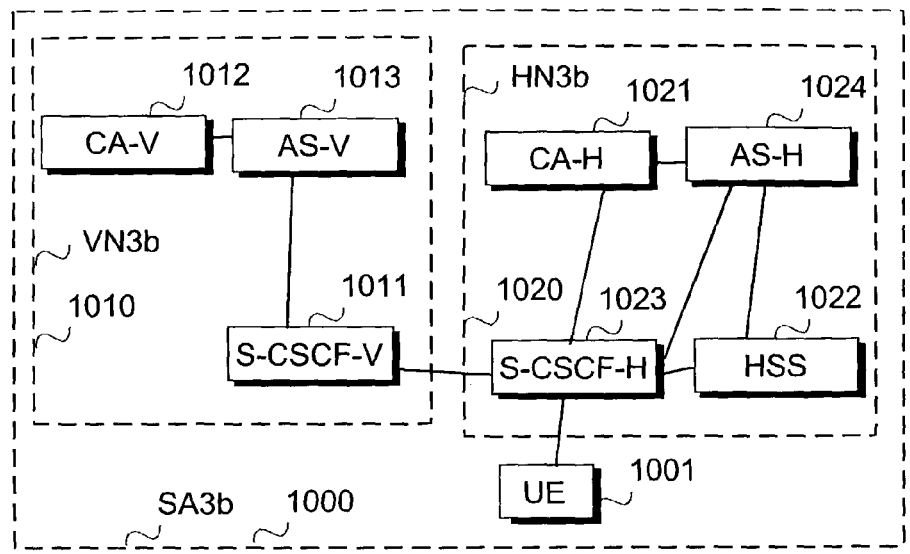

FIG. 10 illustrates an exemplary system SA3*b* 1000 also utilizing the IMS and being a derivate of the system SA3 800 and of the system SA3*a* 900. System SA3*b* 1000 differs from system SA3*a* 900 only in that system SA3*b* 1000 comprises also an application server AS-V 1013 in the visited network and the P-CSCF has no inventive functionality. Therefore the P-CSCF is not illustrated in FIG. 10 although all signaling is transmitted via the P-CSCF. Since the UE 1001, the certification authority CA (CA-H 1021, CA-V 1012), the S-CSCF (S-CSCF-H 1023, S-CSCF-V 1011), the AS (AS-H 1024, AS-V 1013) and the HSS 1022 and the interfaces between them are described above, the description is not repeated here. However, they need to support required interfaces and signaling. All network nodes and certification authorities are preferably part of a network domain security (NDS) so that secure communication can be provided.

In one implementation, the S-CSCF-H 1023, i.e. the S-CSCF in the home network HN3*b* 1020, may carry out the functionality of the NN1, the AS-H 1024 the functionality of the NN2 and the AS-V 1013 the functionality of the NN3 according to embodiment 5 of the invention or any derivate thereof. When the functionality of the NN1 is implemented at the S-CSCF-H 1023, the functionality of the NN2 at the AS-H 1024 and the functionality of the NN3 at the AS-V 1013, the AS-H 1024, the AS-V 1013 and the S-CSCF-H 1023 have to support required interfaces and signaling.

In a further implementation, the AS-H 1024 the may carry out the functionality of the NN1 and the NN2 and the AS-V 1013 the functionality of the NN3 according to embodiment 5 of the invention or any derivate thereof. When the functionalities of the NN1 and the NN2 are implemented at the AS-H 1024 and the functionality of the NN3 at the AS-V 1013, the AS-H 1024 and the AS-V 1013 have to support required interfaces and signaling.

In the following, a more detailed signaling example based on embodiment 5 and the system SA3*b* 1000 is described. In the detailed example prior art network nodes and signaling messages which are not described above are enclosed to illustrate the information exchange in more detail. In the example it is illustrated that the certificate is requested from the visited network. In the following, the P-CSCF does not need to have an interface with the CA (or to have integrated CA functionality as an alternative to the interface).

The UE 1001 sends message A (e.g. SIP MESSAGE) towards the home network entity, which in this example is the AS-H 1024. As stated above, message A contains an indication that the user wants to have a subscriber certificate from the visited network.

The P-CSCF receives message A and forwards it to the S-CSCF-H 1023. The P-CSCF may reside in the visited network, as illustrated in FIGS. 8 and 9, or the P-CSCF may reside in the home network, although the subscriber (and thus the UE) is roaming, i.e. is in the visited network.

The S-CSCF-H 1023 receives message A and possibly checks whether it is allowed to issue a certificate or certificates to the subscriber (or to the subscriber profile the subscriber is currently using) from the subscription data, as described above. If the issuing of certificates is not allowed, an error message is sent to the UE 1001. If the issuing is allowed, the S-CSCF-H 1023 forwards message A to the ASH. If the S-CSCF-H 1023 is not configured to perform the checking, the S-CSCF-H 1023 simply forwards message A to the AS-H 1024.

When the AS-H 1024 receives message A, the AS-H 1024 possibly checks whether it is allowed to issue a certificate or certificates to the subscriber (or to the subscriber profile the subscriber is currently using) from the subscription data, as described above. If the issuing of certificate is not allowed, an error message is sent to the UE 1001. If the issuing is allowed, or if the AS-H 1024 is configured not to perform the checking, the AS analyzes where to send a subscriber certificate request. Besides the indication, message A may contain some information about the AS-V 1013 and/or the CA-V 1012 in the visited network. The AS-H 1024 may also derive the visited network e.g. on the basis of the information available in "P-Access-Network-Info", which contains Cell Global Identification (CGI) including the mobile country code (MCC) and the mobile network code (MNC). In the latter case, the AS-H 1024 either inquires the address from a network node having a mapping table for pairs formed by the MCC+MNC and the AS-V/CA-V addresses, the network node being in the home network, or the AS-H 1024 comprises the mapping table or corresponding information. However, it is irrelevant for the invention how the AS-H 1024 determines the address. When the AS-H 1024 has determined the address, the AS-H 1024 sends message B towards the AS-V 1013, i.e. the application server in the visited network. Message B contains a subscriber certificate request, i.e. message B contains information indicating that the user wants to have a subscriber certificate from the visited network. The AS-H 1024 may add information about the user (e.g. cellular identity) and/or certificate-related parameters to message B.

The S-CSCF-H 1023 receives message B and sends it to an I-CSCF in the visited network. The I-CSCF is an interrogative connection state control model known by a person skilled in the art. In response to receiving message B, the ICSCF obtains from an HSS-V, i.e. an HSS in the visited network, further routing information regarding the AS-V 1013. The I-CSCF may obtain the further routing information by sending a location query message to which the HSS-V answers by sending a location response message. The response sent by the HSS-V contains preferably the name of an S-CSCF-V 1011, i.e. an S-CSCF in the visited network, or the required capabilities of the S-CSCF-V 1011. In the latter case the I-CSCF preferably selects the S-CSCF-V 1011 according to prior art methods. When the ICSCF knows the S-CSCF-V 1011, it forwards message B to the S-CSCF-V 1011.

The S-CSCF-V 1011 forwards message B to the AS-V 1013. In response to receiving message B, the AS-V 1013 sends message C, i.e. a certificate request, to the CA-V 1012. Message C, i.e. the certificate request, contains information about the user and certificate-related parameters. If the information is not in message B, the information is added to message C by the AS-V 1013. AS-V 1013 may also add to message C some extra information with the information received in message B to the certificate request.

The CA-V 1012 issues the certificate, i.e. decides certificate values, generates and signs the certificate and stores a record in a database. The CA-V 1012 then delivers the certificate to the AS-V 1013 by sending message D, i.e. a certificate response. Message D is a response message to message C.

In response to receiving message D, i.e. the certificate response, the AS-V 1013 generates a response message E, which contains the subscriber certificate. Message E is response message to message B. The AS-V 1013 sends message E to the AS-H 1024 via the S-CSCF-V 1011, the I-CSCF and the S-CSCF-H 1023. Message E may be a "200 OK" -message, for example.

When the AS-H 1024 receives message E, the AS-H 1024 takes the subscriber certificate from message E and inserts it in message F, i.e. a response message to message A, addressed to the UE 1001. The AS-H 1024 sends message F to the UE 1001 via the S-CSCF and the P-CSCF. Message F may be a "200 OK" message, for example.

The parameters added in points 1-2, 3-2, 4-5 or 5-7 of FIGS. 1, 3, 4 and 5 may be MSISDN, IMS identities and certificate-related parameters from the subscription data (or the subscriber profile).

The certificate request is sent preferably after the UE 1001 has performed an IMS registration procedure providing a secure communication channel.

The advantages of using system SA3*b* 1000 to implement the present invention are that the check regarding whether or not it is allowed to issue certificates to the subscriber is performed always in the home operator's network, thus adding flexibility to define checking parameters maintained in the HSS 1022, and that the subscriber certificates can be obtained over any access network that provides access to IMS, i.e. certificates can be obtained independently of the access network. Yet another advantage is that it enables the certificate issuance even when the P-CSCF locates in the home network and the UE 1001 in the visited network, i.e. in a situation when the UE 1001 has no serving IMS network node in the visited network.

System Architecture 4

Figure 11:
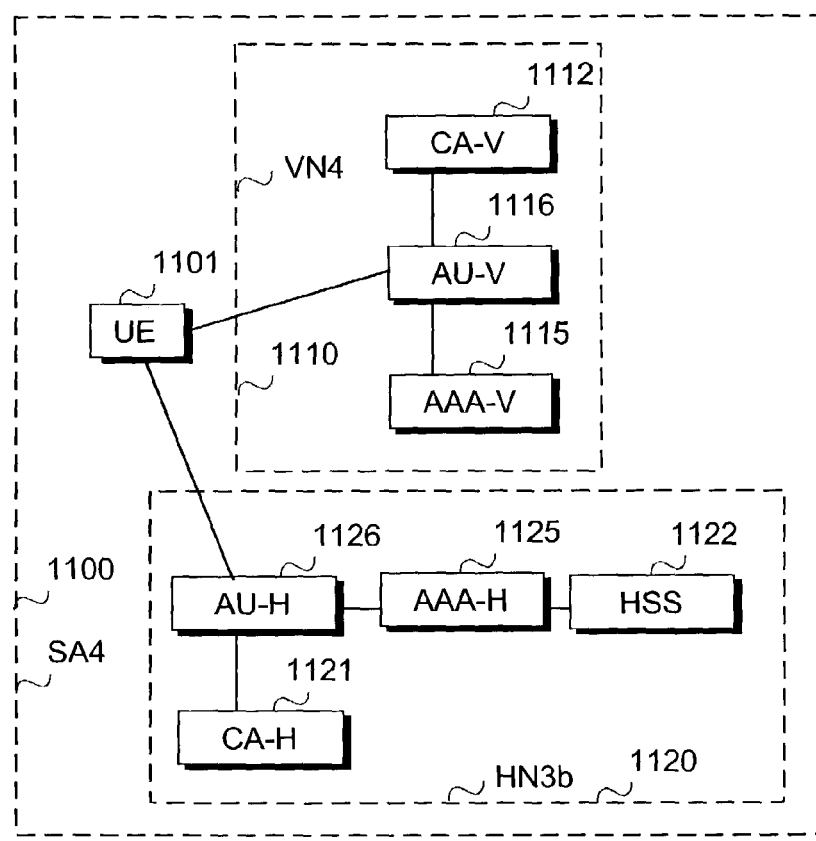

FIG. 11 illustrates an exemplary system SA4 1100 comprising a new logical network node AU for the certificate procedure. The AU may locate in a new physical node only comprising the AU or it may locate in a physical node comprising also another (other) logical network node(s).

The system SA4 1100 comprises a visited network VN4 1110 and a home network HN4 1120 for a subscriber using user equipment UE 1101. The visited network VN4 1110 comprises an AAA (Authorization, Authentication, Accounting) server AAA-V 1115, a network node AU-V 1116 for the certificate procedure and a certification authority CA-V 1112. The home network HN4 1120 comprises an AAA server AAA-H 1125 with which the UE 1101 has static (permanent) trust, a network node AU-H 1126 for the certificate procedure, a certification authority CA-H 1121 and the HSS 1122. It bears no significance to the invention how the UE 1101 is connected to the system infrastructure, how the logical connection between the UE 1101 and the AU-H 1126 is established and how different nodes, networks, authorities and servers are interconnected and therefore the connection alternatives are not discussed here. However, all network nodes and certification authorities are preferably part of network domain security (NDS) so that secure communication between a CA and an AU can be provided.

The UE 1101, the certification authority CA (CA-H 1121, CA-V 1112) and the HSS 1122 are described above and therefore the description is not repeated here. However, they need to support required interfaces and signaling.

The AAA server AAA-H 1125 may comprise subscription data that can be used during authentication. The AAA-V 1115 server may also comprise required subscription data of a roaming UE 1101, the data being downloaded during registration of the UE 1101, for example. The AAA server may correspond to a home location register or a visitor location register of the GSM system, or it may be based on an LDAP (Lightweight Directory Access Protocol) or it can be an application specific server, a Diameter server or a Radius server, for example.

Since there are various ways to implement the AAA servers and the new elements AU-H 1126 and AU-V 1116, the following is only an example illustrating interfaces and protocols that can be used in the SA4 1100. It is obvious that the UE 1101 and the nodes need to support their interfaces. The interface between the UE 1101 and the AUs, i.e. the AU-H 1126 and the AU-V 1116, may be EAP AKA (extensible authentication protocol, authentication and key agreement) providing means to exchange messages related to AKA authentication encapsulated within the extensible authentication protocol (EAP). When the EAP AKA is used in the interface for authentication procedures, PIC (Pre-IKE (Internet key exchange) credential provisioning protocol) can be used between the UE and the AUs, i.e. the AU-H 1126 and the AU-V 1116, for transferring certificate requests and certificate responses. The usage of the PIC between two elements only requires that the elements are IP-capable entities connected to interconnected networks. The PCI sets up an authenticated encrypted connection. The interfaces between the AAA-V 1115 and the AAA-H 1125, between the AAA-V 1115 and the AU-V 1116, between the AAA-H 1125 and the AU-H 1126 and between the AAA-H 1125 and the HSS 1122 are preferably Diameter interfaces. The interface between the AAA-V 1115 and the HSS 1122 is preferably a MAP interface. The interface between the AU and a corresponding CA, i.e. between the AU-H 1126 and the CA-H 1121 and between the AU-V 1116 and the CA-V 1112, is a new interface.

The use of the above identified interfaces produces IP-based authentication and certificate procedures, thereby making them access independent procedures.

The AU may carry out the functionality of the NN according to embodiment 1, 2 or 3 of the invention or any derivate thereof. In embodiment the interface between the AU and the CA is preferably based on an existing standard RA-CA interface or on a corresponding standard interface.

When the functionality of the NN is implemented at the AU of the system SA4 1100 with the interfaces described above, the UE 1101 selects to which one of the AUs it sends the message containing the certificate request. The UE 1101 then sends the message towards the address of the selected AU and the AU performs an authentication procedure in response to receiving the message containing the certificate request. In other words, after receiving message 1-2, 2-2 or 3-2 the AU and the AAA server residing in the same network as the AU perform an authentication procedure before point 1-3, 2-3 or 3-3 in FIGS. 1 to 3. If the authentication fails, instead of carrying out above-mentioned point 1-3, 2-3 or 3-3, the AU sends a negative response to the UE 1101. Furthermore, the AAA-V 1115 is preferably arranged to request the subscription data during the authentication from the HSS either directly, using the existing MAP-based roaming infrastructure, for example, or indirectly via the AAA-H 1125.

Yet in another implementation, the AU-H 1126 may carry out the functionality of the NN1 and the AU-V 1116 the functionality of the NN2 according to embodiment 4 of the invention or any derivate thereof. When the functionality of the NN1 is implemented at the AU-H 1126 and the functionality of the NN2 at the AU-V 1116, the AU-H 1126 and the AU-V 1116 have to support required interfaces and signaling.

In a further implementation, the AU-H 1126 the may carry out the functionality of the NN1 and the NN2 and the AU-V 1116 the functionality of the NN3 according to embodiment 5 of the invention or any derivate thereof. When the functionalities of the NN1 and the NN2 are implemented at the AU-H 1126 and the functionality of the NN3 at the AU-V 1116, the AU-H 1126 and the AU-V 1116 have to support required interfaces and signaling.

In the following, yet another signaling example based on embodiment 5 and the system SA4 1100 is described. It is obvious to one skilled in the art how to implement the detailed example to other embodiments. In the following, it is assumed that a security association has been set up between the UE 1101 and the AU-H 1126 and that the certificate is requested from the visited network.

The UE 1101 sends message A towards the home network entity, which in this example is the AU-H 1126. As stated above, message A contains an indication that the user wants to have a subscriber certificate from the visited network.

When the AU-H 1126 receives message A, the AU-H 1126 possibly checks whether it is allowed to issue a certificate or certificates to the subscriber (or to the subscriber profile the subscriber is currently using) from the subscription data, as described above. If the issuing of certificate is not allowed, an error message is sent to the UE 1101. If the issuing is allowed, or if the AU-H 1126 is configured not to perform the checking, the AU-H 1126 analyzes where to send a subscriber certificate request. Besides the indication, message A may contain some information about the AU-V 1116 and/or the CA-V 1112 in the visited network. The AU-H 1126 may also derive the visited network e.g. on the basis of the information available in "P-Access-Network-Info", which contains Cell Global Identification (CGI) including the mobile country code (MCC) and the mobile network code (MNC). In the latter case, the AUH either inquires the address from a network node having a mapping table for pairs formed by the MCC+MNC and the AU-V/CA-V addresses, the network node being in the home network, or the AU-H 1126 comprises the mapping table or corresponding information. However, it is irrelevant for the invention how the AU-H 1126 determines the address. When the AU-H 1126 has determined the address, the AU-H 1126 sends message B towards the AU-V 1116. Message B contains a subscriber certificate request, i.e. message B contains information indicating that the user wants to have a subscriber certificate from the visited network. The AU-H may add information about the user (e.g. cellular identity) and/or certificate-related parameters to message B.

In response to receiving message B, the AU-V 1116 possibly checks whether it is allowed to issue a certificate or certificates to the subscriber (or to the subscriber profile the subscriber is currently using) from the subscription data, as described above, or on the basis of the home network of the subscriber, for example. If the issuing of certificate is not allowed, an error message is sent to the UE via the AU-H 1126. If the issuing is allowed, or if the AU-V 1116 is configured not to perform the checking, the AU-V 1116 sends message C, i.e. a certificate request, to the CAV 1112. Message C, i.e. the certificate request, contains information about the user and certificate-related parameters. If the information is not in message B, the information is added to message C by the AU-V 1116. The AU-V 1116 may also add to message C some extra information with the information received in message B to the certificate request.

The CA-V 1112 issues the certificate, i.e. decides certificate values, generates and signs the certificate and stores a record in a database. The CA-V 1112 then delivers the certificate to the AU-V 1116 by sending message D, i.e. a certificate response. Message D is a response message to message C.

In response to receiving message D, i.e. the certificate response, the AU-V 1116 generates a response message E, which contains the subscriber certificate. Message E is response message to message B. The AU-V 1116 sends message E to the AU-H 1126.

When the AU-H 1126 receives message E, the AU-H 1126 takes the subscriber certificate from message E and inserts it in message F, i.e. a response message to message A, addressed to the UE 1101. The AU-H 1126 sends message F to the UE 1101.

The parameters added in points 1-2, 3-2, 4-5 or 5-7 of FIGS. 1, 3, 4 and 5 may be MSISDN, IMSI and certificate-related parameters from the subscription data (or from a profile the subscriber is currently using). The AU may receive the parameters from the AAA server together with the indication indicating that the authentication was successful. The AAA server may also be arranged to send the parameters with an indication indicating that the authentication failed. The AAA server may request these parameters from the HSS 1122. The AU may also request these parameters from the HSS via the AAA server, for example.

The advantages of using the system SA4 1100 to implement the present invention are that the system is access-independent as regards certificate requests, it is technically feasible since the new node AU has no arbitrary constraints, and therefore anything can be specified and designed. Furthermore, the SA4 1100 enables synergies with WLAN (wireless local area network) security solutions, and changes to an application layer of the system are easier to build on top of existing terminals supporting e.g. WIM (Wireless Identity Module) and USIM (UMTS SIM). A further advantage is that when using the system SA4 1100 no changes are needed in the existing cellular protocols and network nodes.

Although the invention is described above assuming that the UE 1101 adds to the certificate request an indication indicating the network from which the certificate is to be issued, it is obvious for one skilled in the art that it is possible for the UE 1101 not to add the indication when it is not actually needed. For example, in system architecture SA2 700 the certificate is received from the GGSN determined by the PDP context used for transferring the certificate request, i.e. from the GGSN with which the PDP context is activated. Therefore, the UE 1101 need not to add the indication to the certificate request.

Although the invention is described above assuming that only one network node checks, whether or not it is allowed to issue certificates, it is obvious to a person skilled in the art that the check may be performed in two or more nodes. For example, the S-CSCF-H 1023 in FIG. 10 may be configured to check whether or not it is allowed to issue certificates for subscribers roaming in a particular visited network, and the AS-H 1024 to check whether or not it is allowed to issue certificates for the subscriber.

Although the invention is described above assuming that only one network node adds parameters to the message containing the certificate request, it is obvious to a person skilled in the art that the adding may be performed in two or more nodes. For example, the AS-H 1024 in FIG. 10 may be configured to add subscriber to message C some extra information with the information received in message B to the certificate request.

The CA-V 1112 issues the certificate, i.e. decides certificate values, generates and signs the certificate and stores a record in a database. The CA-V 1112 then delivers the certificate to the AU-V 1116 by sending message D, i.e. a certificate response. Message D is a response message to message C.

In response to receiving message D, i.e. the certificate response, the AU-V 1116 generates a response message E, which contains the subscriber certificate. Message E is response message to message B. The AU-V 1116 sends message E to the AU-H 1126.

When the AU-H 1126 receives message E, the AU-H 1126 takes the subscriber certificate from message E and inserts it in message F, i.e. a response message to message A, addressed to the UE 1101. The AU-H 1126 sends message F to the UE 1101.

The parameters added in points 1-2, 3-2, 4-5 or 5-7 of FIGS. 1, 3, 4 and 5 may be MSISDN, IMSI and certificate-related parameters from the subscription data (or from a profile the subscriber is currently using). The AU may receive the parameters from the AAA server together with the indication indicating that the authentication was successful. The MA server may also be arranged to send the parameters with an indication indicating that the authentication failed. The AAA server may request these parameters from the HSS 1122. The AU may also request these parameters from the HSS via the AAA server, for example.

The advantages of using the system SA4 1100 to implement the present invention are that the system is access-independent as regards certificate requests, it is technically feasible since the new node AU has no arbitrary constraints, and related parameters and the AS-V 1013 network related parameters to the message containing the certificate request.

Although the invention is described above assuming that the subscriber is within the service area of a visited network, it is obvious to a person skilled in the art how to implement the invention when the subscriber is within his home network.

Although the invention is described above assuming that the CA is either in the home network or in the visited network, it is obvious to a person skilled in the art that the invention is also applicable when the CA for whom the certificate is requested resides in some other network than the above mentioned networks or is a separate element not belonging to any particular network.

It is obvious to a person skilled in the art that different features and functions described above with specific embodiments and systems can be combined freely to create other embodiments of the invention or another systems implementing the inventive embodiments.

The telecommunication system and network nodes implementing the functionality of the present invention comprise not only state-of-the-art means required for certificate issuance but also means for maintaining and checking information indicating whether or not the certificate issuance is allowed or denied and means for using the result of the checking procedure in the manner described above. Present network nodes and user equipment comprise processors and memory that can be utilized in the functions according to the invention. All modifications and configurations required for implementing the invention may be performed as routines, which may be implemented as added or updated software routines, application circuits (ASIC) and/or programmable circuits, such as EPLD (Electrically Programmable Logic Device), FPGA (Field Programmable Gate Array).

It will be obvious to a person skilled in the art that as technology advances the inventive concept can be implemented in various ways. The invention and its embodiments are not limited to the examples described above but may vary within the scope of the claims.

The invention claimed is:
1. A method, comprising:
receiving a certificate request from a subscriber of a communication system;
obtaining subscription data of the subscriber from a home subscriber server of the subscriber, the obtained sub- scription data comprising at least a first parameter indicating whether or not it is allowed to issue a certificate to the subscriber;

checking, in response to the certificate request, from the obtained subscription data whether the parameter allows issuing a certificate to the subscriber;

checking a network policy whether or not it allows issuing a certificate; and generating and delivering the certificate only if the parameter and the network policy allow certificate issuance to the subscriber.

2. The method of claim 1, wherein the communication system comprises two or more networks, one of the networks being the subscriber's home network, the method further comprising:

receiving in the certificate request an indication of a network from which the certificate is requested;

performing the obtaining and checking in the subscriber's home network; and delivering the certificate from the indicated network.

3. The method of claim 1, wherein the communication system comprises two or more networks, one of the networks being the subscriber's home network, the method further comprising:

receiving in the certificate request an indication of a network from which the certificate is requested;

performing the obtaining and checking in the indicated network; and delivering the certificate from the indicated network.

4. The method of claim 1, wherein the communication system comprises two or more networks, one of the networks being the subscriber's home network, the method further comprising:

receiving in the certificate request an indication of a network from which the certificate is requested;

performing the obtaining and checking in a network serving the subscriber; and delivering the certificate from the indicated network.

5. An apparatus, comprising:
a processor configured to:
receive a certificate request from a subscriber of a communication system;
obtain subscription data of the subscriber from a home subscriber server of the subscriber, the obtained subscription data comprising at least a first parameter indicating whether or not a certificate is allowed to be issued;
check from the obtained subscriber's subscription data whether the first parameter allows a certificate to be issued to the subscriber; and
apply a result of the checking procedure to decide whether to continue a certificate issuing procedure triggered by the certificate request,
wherein the decision to issue the certificate is also dependent on a policy of a network the apparatus belongs to.

6. The apparatus of claim 5, wherein the processor is configured to add further parameters to the certificate request and to forward the certificate request to a certificate issuing network node.

7. The apparatus of claim 5, wherein the processor is further configured to generate a certificate template and to forward the certificate template to a certificate signing network node.

8. The apparatus of claim 5, wherein the processor is further configured to issue the certificate and further configured to deliver the issued certificate to the subscriber.

9. A system, comprising:
a first network node comprising subscription data related to a user of user equipment, the subscription data comprising a first parameter that indicates whether a certificate is allowed to be issued to the user;
user equipment is configured to send a certificate request, the certificate request not containing the first parameter; and
a second network node having a certification authority configured to provide certificates;
wherein the system is configured to obtain the subscription data comprising at least the first parameter from the first network node, to check from the subscription data, in response to the certificate request, the first parameter to find out whether a certificate is to be issued to the user equipment, and to issue the certificate only if the first parameter allows the certificate issuance,
wherein the decision to issue the certificate is also dependent on a policy of a network the second network node belongs to.

10. The system of claim 9, further comprising a third network node, via which the certificate request is transmitted to the second network node, the third network node being configured to add to the certificate request at least a further parameter or a set of further parameters; and the second network node is configured to perform the checking and the issuance of the certificate using, in addition to the first parameter obtained in the subscription data, at least one added further parameter received in the request.

11. The system of claim 10, wherein the third network node is configured to authenticate the user equipment in response to receiving the certificate request and to forward the certificate request only if the authentication succeeds.

12. The system of claim 9, further comprising a third network node, via which the certificate request is transmitted to the second network node, the third network node being configured to perform the checking, to generate a certificate template if the certificate issuance is allowed and to transmit the certificate template as the certificate request to the second network node; and the second network node is configured to provide the certificate by signing the certificate template.

13. The system of claim 9, further comprising a third network node, via which the certificate request is transmitted to the second network node, the third network node being configured to perform the checking and to add to the certificate request at least a parameter or a set of parameters indicating a content of the first information if the certificate issuance is allowed; and the second network node is arranged to perform the issuance of the certificate.

14. The system of claim 9, further comprising two or more networks, wherein the user equipment is arranged to indicate in the certificate request a network from which the certificate is requested.

15. A computer readable storage medium encoded with computer code for performing a method, comprising:
obtaining subscription data of a subscriber from a home subscriber server of the subscriber, the obtained subscription data comprising at least a parameter indicating whether a certificate is allowed to be issued to the subscriber;
checking, in response to a certificate request from the subscriber, from the obtained subscriber's subscription data whether the parameter allows a certificate to be issued to the subscriber; and
using a result of the checking procedure to decide whether to continue a certificate issuing procedure triggered by the certificate request, wherein the decision to issue the certificate is also dependent on a policy of a network the apparatus belongs to.

16. An apparatus, comprising:
processing means for
receiving a certificate request from a subscriber of a communication system;
obtaining subscription data of the subscriber from a home subscriber server of the subscriber, the obtained subscription data comprising at least a first parameter indicating whether or not a certificate is allowed to be issued;
checking from the obtained subscriber's subscription data whether the first parameter allows a certificate to be issued to the subscriber; and
applying a result of the checking procedure to decide whether to continue a certificate issuing procedure triggered by the certificate request,
wherein the decision to issue the certificate is also dependent on a policy of a network the apparatus belongs to.

17. An apparatus configured to receive a certificate request from a subscriber of a communication system, the apparatus comprising:
a processor configured to, in response to a reception of a certificate request, to obtain subscription data of the subscriber from a home subscriber server of the subscriber, wherein the obtained subscription data comprises at least a first parameter configured to indicate whether or not a certificate is allowed to be issued, to check from the obtained subscriber's subscription data whether the first parameter allows a certificate to be issued to the subscribe, and to decide whether to continue a certificate issuing procedure triggered by the certificate request,
wherein the decision to issue the certificate is also dependent on a policy of a network the apparatus belongs to.

18. The apparatus of claim 17, wherein the processor is further configured to add further parameters to the certificate request, and wherein the apparatus is further configured to forward the certificate request to a certificate issuing network node.

19. The apparatus of claim 17, wherein the processor is further configured to generate a certificate template, and wherein the apparatus is further configured to forward the certificate template to a certificate signing network node.

20. The apparatus of claim 17, wherein the processor is further configured to issue the certificate, and wherein the apparatus is configured to deliver the issued certificate to the subscriber.

\* \* \* \* \*